United States Patent
Guigui et al.

(10) Patent No.: US 10,387,225 B2
(45) Date of Patent: Aug. 20, 2019

(54) DISTRIBUTED EVENT PROCESSING

(71) Applicant: HEWLETT PACKARD ENTERPRISE DEVELOPMENT LP, Houston, TX (US)

(72) Inventors: Alain Guigui, Grenoble (FR); Remi Verney, Grenoble (FR); Denis Roger, Grenoble (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 16 days.

(21) Appl. No.: 15/750,090

(22) PCT Filed: Sep. 30, 2015

(86) PCT No.: PCT/US2015/053164
§ 371 (c)(1),
(2) Date: Feb. 2, 2018

(87) PCT Pub. No.: WO2017/023340
PCT Pub. Date: Feb. 9, 2017

(65) Prior Publication Data
US 2018/0225158 A1    Aug. 9, 2018

(30) Foreign Application Priority Data
Aug. 6, 2015    (EP) .................................... 15306271

(51) Int. Cl.
*G06F 9/54* (2006.01)
*G06F 9/50* (2006.01)

(52) U.S. Cl.
CPC ............ *G06F 9/542* (2013.01); *G06F 9/5077* (2013.01); *G06F 2209/505* (2013.01)

(58) Field of Classification Search
None
See application file for complete search history.

(56) References Cited

U.S. PATENT DOCUMENTS 6,496,831 B1    12/2002    Baulier et al.
7,529,764 B2    5/2009    Gutsche
(Continued)

FOREIGN PATENT DOCUMENTS

CN    104394149 A    3/2015
WO    WO-2009140363 A1    11/2009

OTHER PUBLICATIONS

Dominik Riemer et al., "SEPP: Semantics-Based Management of Fast Data Streams," 2014 IEEE 7th International Conference on Service-Oriented Computing and Applications (SOCA), Nov. 5, 2014, pp. 113-118, IEEE.
(Continued)

*Primary Examiner* — Craig C Dorais (57) ABSTRACT

Certain examples described herein provide a data processing system and method adapted for event processing. These examples provide for distribution of data processing operations between server computing devices. In one case, a plurality of processing stages are implemented using computing instances on the server computing devices. In this case, the computing instances are assigned to the server computing devices in order to perform at least one data processing operation in parallel. Certain examples described herein then provide for the distribution of data between computing instances such that parallelism is maintained for data processing operations. In certain cases, a composite key is used. In this case, a composite key value is computed for a set of data fields associated with a data item to be processed. This key value is computed based on a data processing operation to be performed. The key value is used to route the data item to an associated computing instance implementing the data processing operation.

15 Claims, 4 Drawing Sheets

(56) References Cited

U.S. PATENT DOCUMENTS

| | | |
|---|---|---|
| 8,589,949 B2 | 11/2013 | Biazetti et al. |
| 9,002,822 B2 | 4/2015 | Jerzak et al. |
| 2005/0021745 A1 | 1/2005 | Bookman et al. |
| 2009/0292759 A1 | 11/2009 | Piper et al. |
| 2010/0318674 A1 | 12/2010 | Mond et al. |
| 2011/0246445 A1 | 10/2011 | Mishra et al. |
| 2011/0314019 A1 | 12/2011 | Peris et al. |
| 2012/0124584 A1 | 5/2012 | Addala et al. |
| 2013/0191185 A1 | 7/2013 | Galvin |
| 2013/0262443 A1 | 10/2013 | Leida et al. |
| 2014/0101093 A1* | 4/2014 | Lanphear .............. G06F 16/254 707/602 |
| 2016/0063044 A1* | 3/2016 | Pradeep ............ G06F 17/30094 707/739 |

OTHER PUBLICATIONS

International Search Report and Written Opinion, International Application No. PCT/US2015/053164, dated Apr. 19, 2016, pp. 1-7, KIPO.

Partial European Search Report, EP Application No. 15306271.6, dated Mar. 2, 2016, pp. 1-7, EPO.

* cited by examiner

DISTRIBUTED EVENT PROCESSING

BACKGROUND

Modern computer systems generate large amounts of data. For example, events within a telecommunications infrastructure or a data-center may result in multiple real-time data streams. Event processing is a field of technology directed towards analyzing these data streams. For example, the result of this analysis may be used to manage network services and/or to control complex computer systems. Often the result of event processing is used to control technical systems in real-time or near real-time. One challenge in implementing event processing systems is to handle large numbers of data items that accrue in short time periods. For example, events may occur asynchronously and at different frequencies within a given time period. Another challenge is to perform complex processing operations while still retaining the ability to control technical systems in real-time or near real-time. For example, detecting and/or predicting security breaches on a computer or telecommunications network may involve the processing of multiple asynchronous data sources in real-time in order to prevent significant damage and/or data loss.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Certain examples described herein provide a data processing system and method adapted for event processing. In particular, certain examples described herein provide for distribution of data processing operations between server computing devices. This may enable real-time complex event processing. In one case, a plurality of processing stages, e.g. that may be interconnected and form part of a processing pipeline, are implemented using computing instances on the server computing devices. In this case, the computing instances are assigned to the server computing devices in order to perform at least one data processing operation in parallel. Certain examples described herein then provide for the distribution of data between computing instances such that parallelism is maintained for complex data processing operations, such as data aggregation and correlation. To achieve this a composite key is used, which may be viewed as a form of compound index. In this case, a composite key value is computed for a set of data fields associated with a data item to be processed, e.g. a data item associated with an event. This key value is computed based on a data processing operation to be performed. Following computation for a particular data item, the key value is used to route the data item to an associated computing instance implementing the data processing operation. This approach enables rapid real-time or near real-time processing of event streams such that complex technical systems, such as telecommunications networks or computing clusters, may be effectively controlled.

Certain examples described herein provide benefits over comparative batch data processing systems and methods. For example, in order to meet computing performance targets (e.g. in terms of available memory or processor resources), certain comparative methods use scheduled queries upon data stored in a database (e.g. an event stream may be dumped to the database for later processing). While these comparative methods enable complex event processing, they lack the ability to perform real-time processing; the time period between an occurrence of an event and completion of a data processing operation may be several minutes or hours. This is not useable for real-time control. For example, in a telecommunications system there may be a desire for anomaly detection (e.g. unauthorized use of user equipment) and/or geo-localized content delivery (e.g. a user may wish for a map of Grenoble to be delivered to user equipment when they arrive at a central train station). This is not compatible with these comparative batch processing methods; for these uses, a delay of a few seconds or milliseconds is desired. However, certain examples described herein do enable rapid event processing on this time scale, allowing anomaly detection and geo-localized content delivery within a telecommunications system. Of course, these are simply two of many different possible real-time applications; for example, another case may be real-time power control of a data-center or the control of virtualized network components (e.g. dynamic provision of load balancing elements).

In other comparative cases, a 'MapReduce' approach may be used, e.g. wherein processing tasks are split into a 'Map' stage that filters and sorts data, followed by a 'Reduce' stage that performs summary operations, both stages being split into a number of parallelizable functions. While this enables input data to be split into batches that may be processed independently in parallel, it is difficult to perform multiple computations based on inter-related data that exists within multiple batches; these need to be split into additional downstream MapReduce operations. Additionally, functions need to be explicitly programmatically defined, which takes many hours of skilled computer engineer time and which leads to solutions that remain system-specific. In contrast, certain examples described herein enable streamlined parallel execution of data processing operations, wherein processing pipelines may be easily configured and reused without extensive programming.

Figure 1:
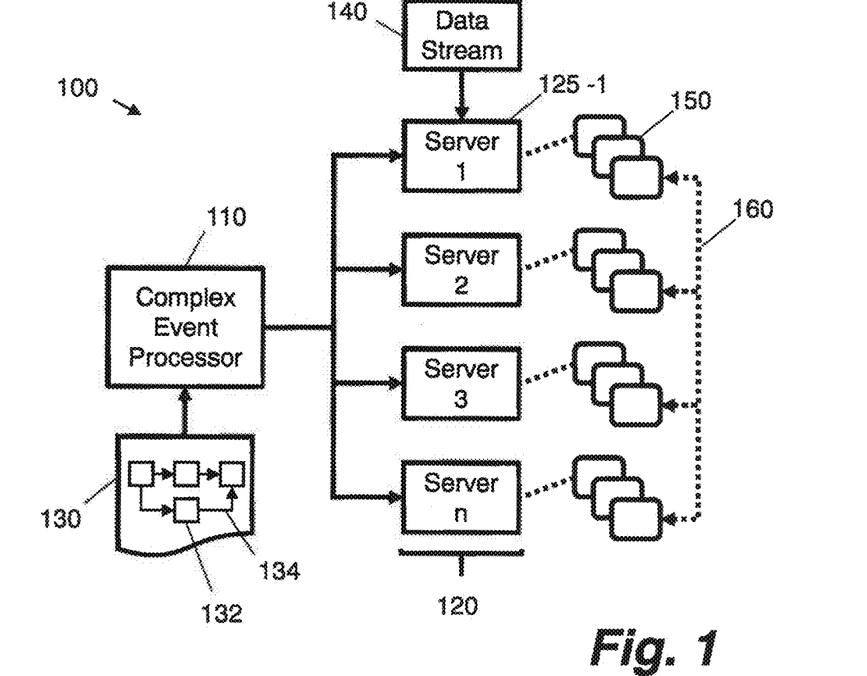
FIG. 1 is a schematic diagram showing a data processing system according to an example.

FIG. 1 shows a data processing system 100 according to one example. The data processing system in this case comprises a complex event processing engine to distribute real-time data processing operations between server computing devices 120. In this case, real-time relates to processing on an order of seconds or milliseconds (e.g. including near real-time) such that feedback or control based on the processing may be provided without appreciable delay, e.g. as compared to processing that is performed at a time subsequent to an event occurring that takes minutes or hours to complete. The complex event processing engine 110 may be implemented by a server computing device, e.g. a computing device comprising memory and at least one processor wherein the operation of the complex event processing engine 110 is implemented by way of machine readable instructions that are loaded from the memory and executed by said processor.

The complex-event processing engine 110 of FIG. 1 is configured to load configuration data 130 defining processing stages 132 in a processing pipeline. For example, the configuration data 130 may comprise a data file that is retrieved from a file system and loaded via an interface of the complex event processing engine 110. The complex event processing engine 110 is configured to use the configuration data 130 to control data processing operations that are implemented on the server computing devices 120 (e.g. as indicated by the arrows in FIG. 1).

The processing pipeline in the present example is configured to process at least one data record stream 140. The data record stream 140 comprises a stream, e.g. a series of sequence in time, of data records associated with events in a technical system. For example, the technical system may comprise, amongst others: a telecommunications system; a computer network; a data storage system; a virtualized network infrastructure; a server cluster; or other infrastructure control system. The data record stream 140 may comprise data records associated with a sequence of events that occur within the technical system, wherein an event is an action that occurs at a particular time or time period. For example, in a telecommunications system, the event may comprise, amongst others: a creation of a user session; an inspection of a data packet; or sending an electronic message such as an email or short messaging service message. In a data-center, an event may comprise, amongst others: an entry on an operating system log for at least one computing device; a message or error dump from a hardware component; or a measurement, such as a power or temperature reading. In certain cases, the data record stream 140 may comprise multiple event streams from different data sources, e.g. power management events from power supply control electronics and packet information from routing devices. The data record stream 140 may comprise a message queue comprising packets and/or messages defined according to a messaging standard such as the Java Message Service.

The processing pipeline defined in the configuration data 130 has a series or sequence of processing stages 132 that are configured to operate on data received via the data record stream 140. These processing stages 132 have a coupling configuration, e.g. are interconnected via a series of communicative couplings 134 that define a data flow between two or more processing stages 132. Each processing stage may comprise one of: a data loader to read data from at least one file or stream; an event processor to perform a defined data processing operation; and a data writer to save data to at least one file or stream. For example, in a simple case, a first processing stage 132 in a processing pipeline may comprise a data loader to receive data records from the data record stream 140. This data loader may have a defined coupling 134 to an event processor stage that performs a defined data processing operation, such as filtering, splitting, correlation or aggregation. The event processor may then have a defined coupling 134 to a data writer stage to save data as a file or output as new data record stream. The arrangement of processing stages may be complex and/or non-linear.

In the example of FIG. 1, there are a number ('n') of server computing devices 125 that form part of a cluster of server computing devices 120. Each server computing device 125 may comprise memory and at least one processor. In FIG. 1, the cluster of server computing devices 120 is communicatively coupled to the complex event processing engine. Each server computing device 125 is arranged to implement at least one computing instance 150. A computing instance 150 may comprise machine readable instructions that are loadable into memory of a server computer device for execution by the corresponding at least one processor of the device. Each computing instance 150 is configured to implement a processing stage 132 of the processing pipeline. For example, a computing instance 150 may be configured to perform a particular data processing operation on obtained data records. In certain cases, the computing instances 150 may alternatively comprise dedicated hardware components arranged to perform a defined data processing operation and/or any combination of hardware and machine-readable instructions. The computing instances 150 are configured such that a plurality of computing instances implements a corresponding processing stage in parallel. For example, in FIG. 1 there are four processing stages 132 and twelve computing instances 150; as such, in one case, each processing stage may be implemented by three corresponding computing instances in parallel (although other non-equal many-to-one combinations are also possible). In certain cases, as well as at least one processing stage with a one-to-many mapping to computing instances, certain processing stages may have a one-to-one mapping to computing instances. In one implementation, each server computing device may be configured to continuously implement the computing instances in memory, e.g. a data processing operation such as a query or calculation may be performed at a given frequency on any data present in a memory buffer. Continuous, in-memory computing instances implemented over a cluster of server computing devices offer a solution that respectively provides low-latency, high performance and scalability.

In the example of FIG. 1, the complex event processing engine 110 is configured to instruct a distributed assignment of the computing instances 150 across the server computing devices 120. For example, complex event processing engine 110 may control which computing instances are implemented on which server computing devices and which processing stages they relate to. This process may be flexible, additional server computing devices 125 and/or computing instances 150 may be added, in certain cases during operation, to scale up or down the data processing system 100 according to load. This load arises from a frequency of events in the data record stream 140.

As well as instructing a distributed assignment of computing instances 150, the complex event processing engine 110 is also configured to instruct data distribution between the computing instances 150 implementing each processing stage 132, e.g. how data records from the data record stream 140 are passed between the computing instances 150 as indicated by the dashed arrows 160 in FIG. 1. Data distribution in this case is controlled to allow related data records to be processed by a common computing instance. In one case, for a stateful processing stage, data distribution is performed based on a composite key computed according to a data processing operation performed by the stateful processing stage. In this case, "stateful" means that a data processing operation on a data record is dependent on other data records. This is contrasted with "stateless" data processing operations in more detail below. The data distribution is controlled such that input data records from a previous processing stage having a common composite key value are sent to a common computing instance for the stateful processing stage.

The control applied by the complex event processing engine 110 enables correlated data to be processed by a common computing instance and to follow a common processing path through the processing pipeline. For example, if a data processing operation implemented by a computing instance comprises the correlation of two separate data records, a composite key may be computed based on the data field that is correlated between the records (e.g. this could be a "subscribedID" in a telecommunications system). Applying this control avoids a "Reduce" stage, e.g. as found in comparative 'MapReduce' methods where parallel data processing for data fields having a shared key value have to be consolidated. In one case, the complex event processing engine 110 may be arranged to distribute various composite key combinations fairly or evenly across the set of computing instances for a particular processing stage.

In the example of FIG. 1, the complex event processing engine 110 controls data distribution within an implementation of the processing pipeline based on the data processing operations performed by the processing stages 132. A data processing operation may be defined in terms of a particular type of data processing operation (as described above) and an operation configuration. This data may form part of the configuration data 130. Based on this definition, the complex event processing engine 110 is able to automatically derive a data distribution between computing instances implementing the data processing operation. Data distribution for a particular processing stage is based on data output by a previous processing stage (e.g. an input data record for the particular processing stage). In one case, a computing instance 150 is selected to process a data record when a data record is received at a particular processing stage (e.g. is output by a previous stage). Different processing stages may have different data distribution functions to distribute data records between computing instances, as the composite key is computed based on the definition of the data processing operation for each processing stage. The composite key may be computed as a hash of a set of data field values associated with the data processing operation.

For example, a data processing operation may comprise an aggregation operation (e.g. sum data values for a particular data field in a data record based on groupings of at least one other data field). In this case, a composite key may be computed based on a hash of a set of aggregated data field values (e.g. the grouped at least one other data field). In another example, a data processing operation may comprise a correlation operation (e.g. match data records from multiple data record streams based on a value of at least one data field). In this case, a composite key may be computed based on a hash of a set of correlated data field values (e.g. the value of the at least one data field).

A data processing operation may also comprise a geolocation tracking operation. This operation may maintain a record of a location of a moving entity (e.g. a mobile telephone or computing device). This location may comprise a last-known location for the moving entity. In this case, a composite key may be computed based on a hash of a set of data field values associated with the moving entity. These data fields may comprise at least one identifying field for the mobile entity and at least one field defining a geographic position, e.g. a co-ordinate according to the World Geodetic System (WGS) 1984 standard as used by global positioning systems. In another case, a data processing operation may comprise a pattern detection operation. This operation may analyze input data records for temporal and/or sequential patterns based on data field values. In this case, a composite key may be computed based on a hash of a set of data field values in which a pattern is to be detected. As an example of a pattern detection operation, a data field indicating a measured value may be processed to detect a threshold being crossed. The pattern to be detected may then comprise that at least one other data field has values within a predefined range at a time when the measured value is below the threshold and at a subsequent time when the measured value is above the threshold, e.g. Threshold=5 and data records={Time=1; Measured_Field: 3; Other_Data_Field=10}, {Time=2; Measured_Field: 6; Other_Data_Field=10}, {Time=3; Measured_Field: 8; Other_Data_Field=10}. In this example, set of data field values in which a pattern is to be detected may comprise at least the other data fields.

In one case, data distribution may be performed differently for stateless and stateful processing stages. A stateless processing stage may be one in which a data processing operation may be performed on a data record independently of other data records in at least one data record stream 140; comparatively, as introduced above, a stateful processing stage may be one in which a data processing operation on a data record is dependent on other data records in at least one data record stream 140. Or put another way, stateful processing stages have data processing operations that are based on relationships between data records; whereas stateless processing stages are not based on relationships between data records. For a stateless processing stage, the complex event processing engine 110 may be arranged to instruct data distribution between computing instances implementing said stage based on a load balancing function, e.g. a function such as round-robin that provides for an even or fair distribution of load between computing instances.

In one case, data loaders implementing a processing stage may be configured to load data from at least one of the following data sources (amongst others): data files (e.g. comma-separated files); messages from a message broker queue (e.g. an Apache Kafka® event queue); and transmission control protocol (TCP) streams. Similarly, data writers implementing a processing stage may be configured to save (e.g. store or pass) data to at least one of the following data formats (amongst others): data files (e.g. comma-separated files); structured query language (SQL) tables; messages from a message queue (e.g. an Apache Kafka® event queue or a Java Message Service queue); and Hadoop Distributed File System (HDFS) files. Event processors may comprise functions configured to (amongst others): filter data records; correlate two sets of data records; correlate data records with data records in a relational database management system, e.g. to enrich data records in a relational database management system; aggregate data records, e.g. calculate sums, averages and/or deviations based on particular data field groupings; split data records, e.g. partition certain data fields into separate data records; and provide conditional routing, e.g. to other processing stages, based on data field values.

Figure 2:
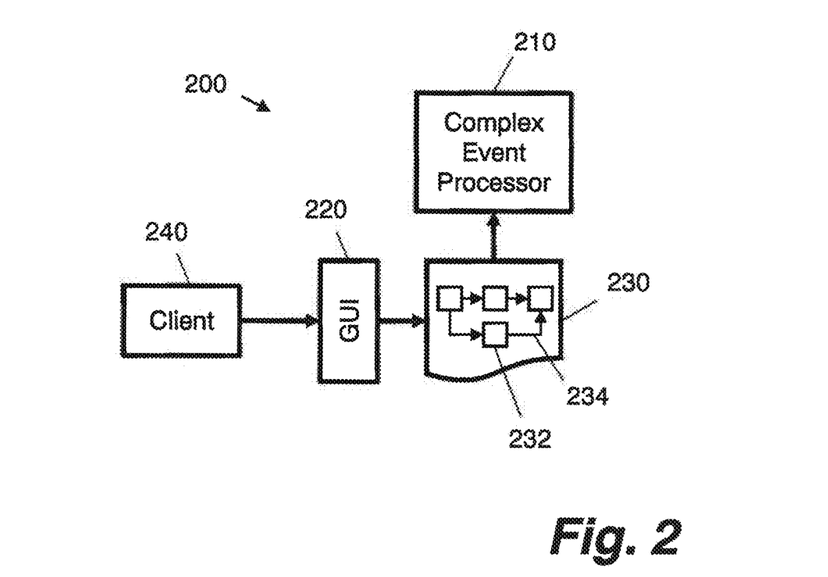
FIG. 2 is a schematic diagram showing a graphical user interface for use with the data processing system of FIG. 1.

FIG. 2 shows an example data processing system 200 whereby a processing pipeline may be configured. FIG. 2 shows a complex event processing engine 210 that accesses configuration data 230 defining a processing pipeline. These components may be equivalent to components 110 and 130 in FIG. 1. Other components that may be present, e.g. the other components of FIG. 1, have been omitted for clarity. In FIG. 2, the data processing system 200 comprises a graphical user interface (GUI) 220 to receive commands from a client device 240 relating to an ordering of processing stages 232 in the processing pipeline and to store configuration data relating to the processing pipeline following the ordering. For example, this ordering may comprise the coupling configuration for the processing stages 232, e.g. the nature of the interconnections 234. A user of the client device may use the graphical user interface to create a new processing pipeline and/or configure an existing processing pipeline. The creation or configuration of the processing pipeline in this case does not take many hours of programming and/or skilled computer engineer time; a user may define the logical sequencing of functional blocks that define the processing stages 232 and the complex event processing engine 210 is configured to control how each processing stage 232 is mapped onto a particular computing instance that implements a functional block. In this case a decision of how to distribute processing across multiple parallel computing instances for a given functional block is computed automatically by the complex event processing engine 210, e.g. as described above. It is then possible to modify the level of parallelism of each stage independently of a pipeline design process; e.g. the former may be performed by modifying the operation of the complex processing pipeline 210 independently of any configuration performed via the graphical user interface 220. In other cases, the configuration data 230 may alternatively, or additionally, be created and/or modified using other methods, e.g. using a command-line interface or a data structure defining a description present in a file deposited in a given directory.

A number of examples of the operation of the data processing system 100 or 200 will now be described with reference to FIGS. 3A and 3B.

Figure 3A:
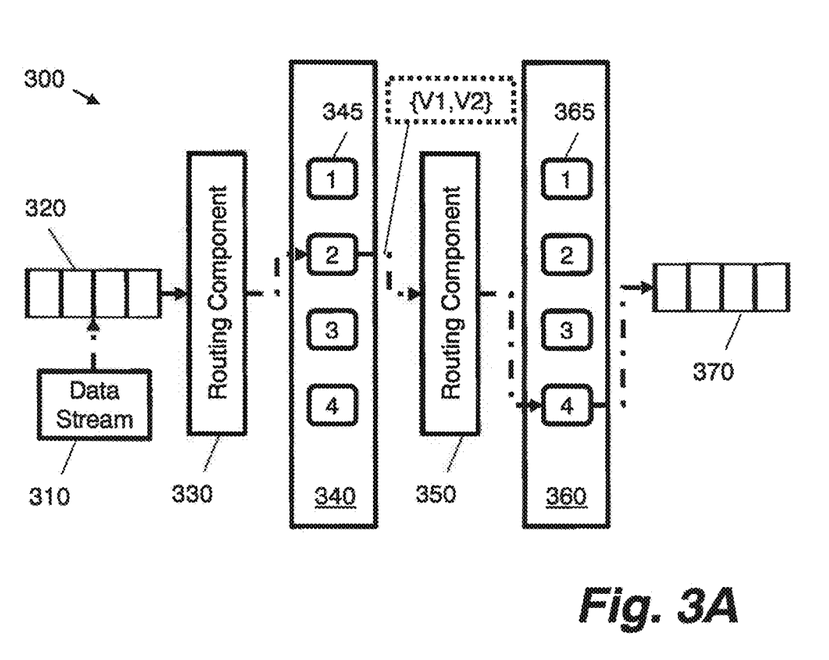
FIGS. 3A and 3B are schematic diagrams showing two examples of data routing within a data processing system.
Figure 3B:
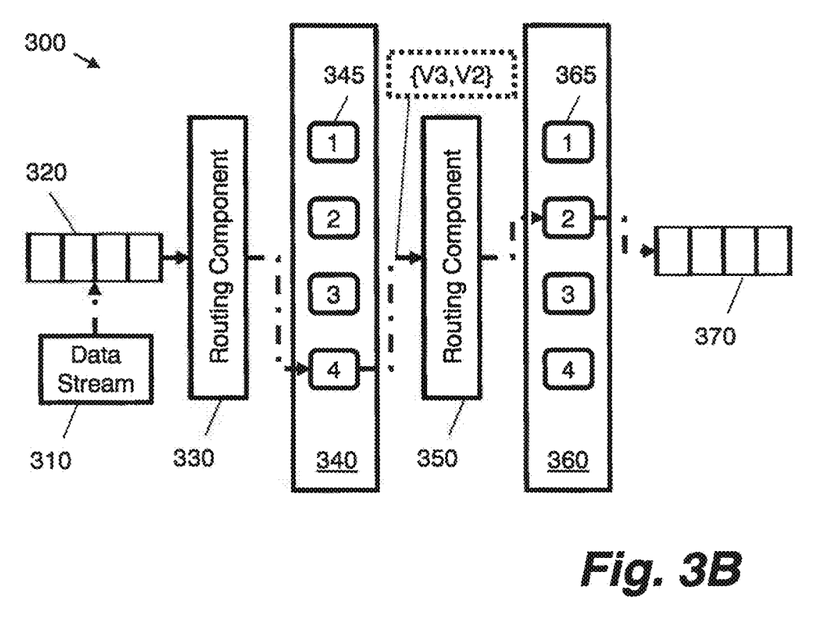

FIGS. 3A and 3B show an example of a data processing system 300, which may relate to the data processing system 100 or 200. Certain components are omitted for clarity. Both Figures show a data stream 310 from which events are added to an event queue 320. The data stream 310 may comprise the data record stream 140 of FIG. 1, wherein events may comprise data records such as messages or log entries. FIGS. 3A and 3B also show two routing components 330 and 350. This may form part of the complex event processing engine 110 in FIG. 1. The routing components 330 and 350 may be implemented as separate components or as separate portions of a common component (e.g. multiple threads of a common computing process).

FIGS. 3A and 3B also show two processing stages 340 and 360. In this example, each processing stage is implemented by four computing instances 345, 365. The first processing stage 340 is a stateless processing stage. For example, it may comprise a filtering operation, e.g. retaining network session creation events from the event queue 320 that relate to a "web" session and discarding session creation events that relate to other session types (e.g. such that "web" sessions (but not sessions of other types) proceed to the second processing stage 360) or filtering data associated with received packets based on a data payload type. Routing component 330 receives events from event queue 320, e.g. data records such as {timestamp, data_field_1, data_field_2, . . . , data_field_n}, and routes these events to one of the four computing instances 345 implementing the first processing stage 340. As the first processing stage is stateless, the routing component 330 is configured to select a computing instance 345-2 of the first processing stage 340 based on a load balancing function to route an event from the event queue 320. The load balancing function may be, for example, a round-robin function. As such the computing instance 345 that is selected may be independent of the data associated with the event, e.g. the data fields of the data record. This may be seen in FIGS. 3A and 3B. In FIG. 3B a second event is routed by the routing component 330 to a different computing instance 345-4 based on the load balancing function. For example, FIG. 3A may represent the data processing system 300 at a first time $t_1$ and FIG. 3B may represent the data processing system 300 at a second time $t_2$. Although in FIGS. 3A and 3B the first and second events that are respectively routed in the Figures are different, if the events had identical data fields but different timestamps, they may still be routed to different computing instances 345 by the first routing component 330.

FIGS. 3A and 3B show a second routing component 360 to route a processed event from a computing instance 345 of the first processing stage 340 to a computing instance 365 of the second processing stage 360. In FIGS. 3A and 3B the second processing stage 360 is stateful. For example, it may comprise an aggregation (e.g. summation) operation based on one or more data field values, e.g. such as computing an average data payload size for received messages associated with different media types (e.g. grouping based on "subscriberID" and "mediaType" fields). The routing component 350 is configured to compute a composite key based on the data processing operation performed by the second processing stage 360 (e.g. based on the 'average' aggregation operation described above). In FIG. 3A, a processed event from the first processing stage 340 comprises at least two data fields {DF1, DF2} that are used in the aggregation operation (e.g. these may be "subscriberID" and "mediaType" fields). Additional data fields (e.g. such as a payload size in kBytes) may be present but are not shown for clarity. In FIG. 3A, the two data fields {DF1, DF2} associated with the processed first event have values of {V1, V2}; in FIG. 3B, the two data fields {DF1, DF2} associated with the processed first event have values of {V3, V2}. As described above, at the routing component 350 the event data records may comprise filtered data records. In one case, the routing component 350 may be configured to compute a value for the composite key based on a hash function of the two data fields, e.g. based on data fields that are aggregated in the second processing stage 360. For example, key1 may equal hash(V1, V2) and key2 may equal hash(V3, V2). In an aggregation operation, a sequence (i.e. a set) of events is aggregated into output events with one or more data fields. Each output data field is the aggregation of a corresponding input data field from related data fields. As another example, a web browsing billing event may contain the following data fields: timestamp, user, downloadVolume, and billedAmount. Assuming the aggregated sequence is: {30 Jul. 2015 18:44:00, "denis", 10K, 0.25$}, {30 Jul. 2015 18:44:00, "remi", 20K, 0.05$}, {30 Jul. 2015 18:44:23, "denis", 20K, 0.75$}, and {30 Jul. 2015 18:44:30, "remi", 30K, 0.15$}, an output of this example aggregation operation on the data would yield {"denis", 30K, 1.00$}, {"remi", 50K, 0.20$}. In this case the two data fields are aggregated (separately) and the aggregation (a simple sum) is grouped by a user identifier.

In FIGS. 3A and 3B, the routing component 350 is configured to identify a computing instance 365 of the second processing stage 360 based on the computed composite key value. In one case, each computing instance 365 may be assigned a particular set of composite key values it is configured to process. This may be performed prior to receipt of data records if the range of data values are known a-priori. In another case, composite key values that are seen for the first time may be routed by the routing component 350 based on a load balancing function, e.g. round-robin; however, a record may be made of the assignment and subsequent occurrences of the same composite key value may be mapped to the same computing instance 365. In any case, the routing component 350 is configured to route the event to the appropriate identified computing instance 365. In FIG. 3A, computing instance 365-4 is associated with key1 and so the processed event from the first processing stage 340 is routed to that instance. In FIG. 3B, computing instance 365-2 is associated with key2 and so the processed event from the first processing stage 340 is routed to that instance. In this example, subsequently received events that have data field values of {V1, V2} will also be routed to the fourth computing instance 365-4; likewise, subsequently received events that have data field values of {V3, V2} will also be routed to the second computing instance 365-2. This routing enables stateful processing operations, e.g. the aggregation operation of the present example, to be properly consolidated. Even though routing based on composite key values is described here, certain processing stages may perform routing based on a single key value, e.g. just "subscriberID". This may be the case if aggregation is based on "subscriberID".

In the present example, following processing by the computing instance 365 implementing the second processing stage 360 the processed events are sent, or dumped into, an output event queue 370. This output event queue 370 may form an input queue for another processing stage, be persistently stored in a database and/or be used to generate a graphical dashboard indicator, e.g. on a control graphical user interface, or a report on system operation. In this case, the output queue may comprise aggregated payload totals for a particular session type. In certain examples, the results in the output event queue 370 may be used to control the operation of a telecommunications network, e.g. set bandwidth throttling for a particular user or assign additional network resources.

Figure 4:
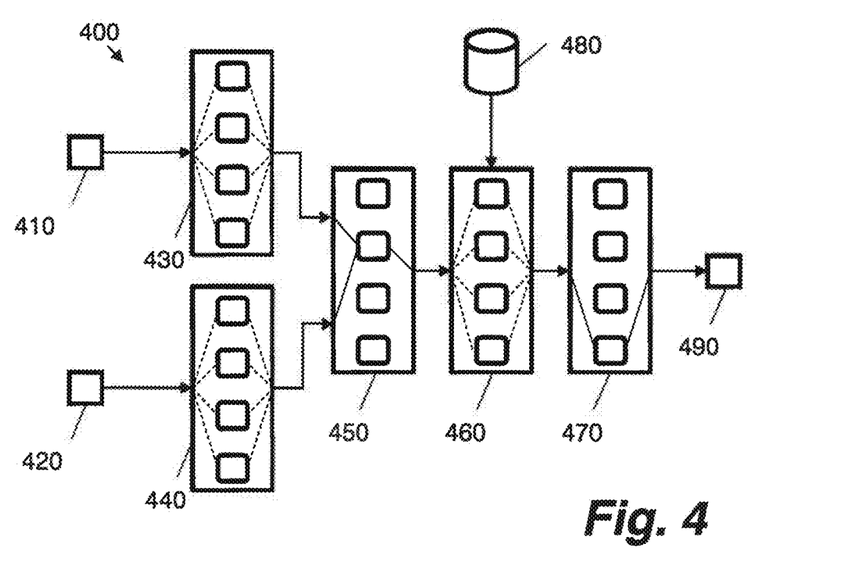
FIG. 4 is a schematic diagram showing a more complex example of data routing within a data processing system.

FIG. 4 shows an extended example data processing system 400 configured to process data from two data records, i.e. event, streams 410, 420 using five processing stages 430, 440, 450, 460, 470. The configuration of the streams and processing stages may be derived from configuration data (e.g. 130, 230) loaded by a complex event processing engine of the data processing system 400. This may be designed by a user via a graphical user interface, such as 220 in FIG. 2. In FIG. 4, the routing or distribution of data between computing instances implementing each processing stage takes one of two forms: dashed lines indicate distribution may be made to any computing instance (e.g. based on a load balancing function) and solid lines indicate explicit routing to a specific instance based on a key value. For example, processing stages 430, 440 and 460 have stateless distribution with dashed lines, and processing stages 450 and 470 have stateful distribution with solid lines. Routing components, if present, have been omitted for clarity; routing or distribution in any case is performed under the instruction of the complex event processing engine of the data processing system 400.

In one example, the first data record stream 410 comprises user session creation events and the second data record stream 420 comprises TCP events, e.g. as determined using 3G deep packet inspection. In the second data record stream 420, events may be generated based on each TCP packet. In this example, first and second processing stages 430 and 440 comprise filtering operations: the first processing stage 430 comprises filtering based on a "sessionType" field value of "web" and the second processing stage 440 comprises filtering based on a "Protocol" field value of "HTTP" (HyperText Transfer Protocol). The third processing stage 450 comprises a correlation stage wherein at least one data record from the first data record stream 410 and at least one data record from the second data record stream 420 are correlated, e.g. matched, based on at least one data field value. In the present example, the correlation at the third processing stage 450 is performed based on a "sessionID" present in the data records of both data record streams 410, 420. As such, records are routed to a particular computing instance based on this "sessionID" data field. For example, in the Figure, data records with a particular "sessionID" value from the first data record stream 410 are routed to the second computing instance implementing the third processing stage 450. Data records with the same "sessionID" value from the second data record stream 420 are then also routed to the second computing instance to enable the two records to be correlated. This enables each TCP/HTTP packet event to be completed with associated session information.

The fourth processing stage 460 in FIG. 4 performs a database correlation operation, wherein data from a database 480, e.g. forming part of a relational database management system, is further correlated with the correlated data records from the third processing stage 450. As this further correlation does not involve matching or grouping of data records, data may be distributed between computing instances based on a load balancing function. For example, a "subscriberID" field in the correlated data records may be correlated with a "subscriberID" field in records in the database 480. This may be performed to allow filtering based on data field values in the database 480. In the present example, correlated data records are filtered based on a data plan associated with a subscriber, e.g. subscribers having access to "unlimited data" may be discarded or filtered out. This may be the case if network control is appropriate for subscribers not having authorized access to unlimited data transfers. Other filtering may also be applied, e.g. based on activities authorized by a subscriber that are recorded in a database 480 (e.g. whether the subscriber wish to receive geo-localized content) or based on characteristics of the subscriber (e.g. determine a home location for fraud detection). Lastly, at a fifth processing stage 470 an aggregation operation is performed. In this case, the fifth processing stage 470 involves a sum of packet size (e.g. from the data records from the second data record stream 420) per "subscriberID" and "media Type" data fields. The "media Type" data field may indicate a media type for packets associated with events (e.g. one of HyperText Markup Language, video, audio, pictures etc.). This is performed, in this example, every 10 seconds and sums of under 200 kB are discarded or filtered out. As this operation is stateful, a specific computing instance receives correlated events from the fourth processing stage 460 (e.g. correlated data records that are not associated with authorized unlimited data transfers) that are related to both a specific subscriber and media type, enabling the aggregation operation to produce useable results. In this case, events relating to a common subscriber but having different media types may be computed on different computing instances; the same applies for events having the same media type but different subscribers. As such a composite key or compound index may be computed based on {"subscriberID", "media Type"}. Events matching composite key values assigned to particular computing instances are routed to those instances, e.g. input data records from a previous processing stage having a common composite key value are sent to a common computing instance for the stateful processing stage such that events with the same composite key value are sent to the same computing instance.

The processing pipeline shown in FIG. 4 may be used to determine, in real-time, network users with high network usage. This may be used to throttle network bandwidth for a particular subscriber, e.g. if the subscriber is limited to a particular amount of data usage, and/or to make available to the subscriber the option to upgrade to higher data usage. The upgrade options may be personalized based on the subscriber, e.g. allowing network throttling and/or restriction to be applied and controlled for particular media types (e.g. for video but not for audio data). FIG. 4 outputs, by way of event stream 490, data records reporting web traffic for a particular set of subscribers for each subscriber and media type for traffic exceeding more than 200 kB in the last 10 seconds.

FIG. 4 is a specific example set out for ease of explanation of the example systems and methods described herein. The approach described in the examples herein may be applied to an endless variety of interconnected processing stages, in order to distribute data to computing instances implementing those processing stages in parallel. Although FIGS. 3A, 3B and 4 show a single processing pipeline a given complex event processor may be configured to implement multiple processing pipelines in parallel, e.g. the pipelines of FIGS. 3A/3B and FIG. 4 may be both implemented at the same time to provide two real-time output event streams.

In one case, an output event queue may comprise data records with statistical metrics covering mobile web sessions (e.g. over 3G and/or 4G) that are currently open by subscribers and/or statistical metrics and/or thresholds may be applied to detect abnormal activity occurring on a subscriber account (e.g. in relation to fraud detection and/or to assign network resources if network performance drops below predefined limits). These threshold or limits may be related to latencies and/or bandwidth usage in certain cases. Metrics may be calculated for any data field present in the events and/or any data field that may be correlated with data fields present in the events (e.g. in a processing stage similar to the fourth processing stage 460 in FIG. 4). For example, metrics may be calculated separately for different data types (e.g. video, audio, web traffic, etc.). Quality of experience of users or subscribers accessing a technical system (e.g. a telecommunications infrastructure) may be determined by implementing a processing pipeline in real time. In certain cases this may be compared with a particular subscription level for a subscriber. If quality of experience, e.g. as indicated by at least one statistical metric, drops below a predefined threshold then, using the examples described herein, this may be detected immediately and appropriate corrective control actions applied as soon as possible (e.g. in real-time or near real-time). For example, traffic may be prioritized in real-time depending on subscriber usage. The configurability of the processing pipeline allows calculated metrics to either be displayed and/or stored in persistent storage (e.g. a relational database or an output file) for later analysis. Detected alarms (e.g. threshold violations) may result in immediate action and so may be sent to an output event queue that is configured to be consumed by control systems in real-time. Certain examples described herein may also be used to send geo-localized data content to subscribers as soon as user equipment is detected as entering a defined geographical area.

In example test systems, with a 3-node cluster with 32 logical central processing units operating at 50% maximum loading, a complex event processing engine was able to process 300K events/second and take input from two 150K events/second data record streams, e.g. to implement the example of FIG. 4. Each data record in this test case comprised eight data fields. In this test case, the EsperTech® Event Processing Language was used to implement the data processing operations. For cases with fewer processing stages, e.g. filtering and aggregation such as shown in FIGS. 3A and 3B, up to 1,300K events/second were processed on the same hardware configuration.

In these examples the computing instances may be spread across a cluster of servers, which may comprise a plurality of physical server computing devices. In certain cases, the complex event processing engine described herein and/or the server computing devices in the cluster may be implemented as virtualized network functions. For example, the complex event processing engine and the cluster of servers may be deployed as a virtualized network function, wherein the elasticity of the cluster (e.g. a number of computing nodes running computing instances), among other parameters, may be controlled by an operator as a virtualized network function parameter. In this case, elasticity may be automatically controlled to manage a processing load, e.g. more (virtual) computing nodes may be added to implement server computing devices as demand increases. This may be performed to optimize a number of computing nodes given a current workload. It also enables the complex event processing engine to be implemented in a similar manner to other portions of a virtualized telecommunications infrastructure.

In certain examples, the complex event processing engine described herein may be used to control a set of virtualized network functions. For example, a processing pipeline may measure the capacity and/or performance of a set of virtualized network functions so as to control the orchestration of these functions, e.g. scaling similar to that described above for the cluster. The real-time abilities of the complex event processing engine enable predictive and/or prescriptive computations to be applied to at least one input data stream. This may enable network functionality to be controlled pro-actively and accurately, e.g. without waiting the minutes or hours that may result in a network function being overloaded.

Certain example distributed data processing methods will now be described with reference to FIGS. 5 and 6. These methods may be applied by the complex event processing engine 110, 210 shown in FIG. 1 or 2.

Figure 5:
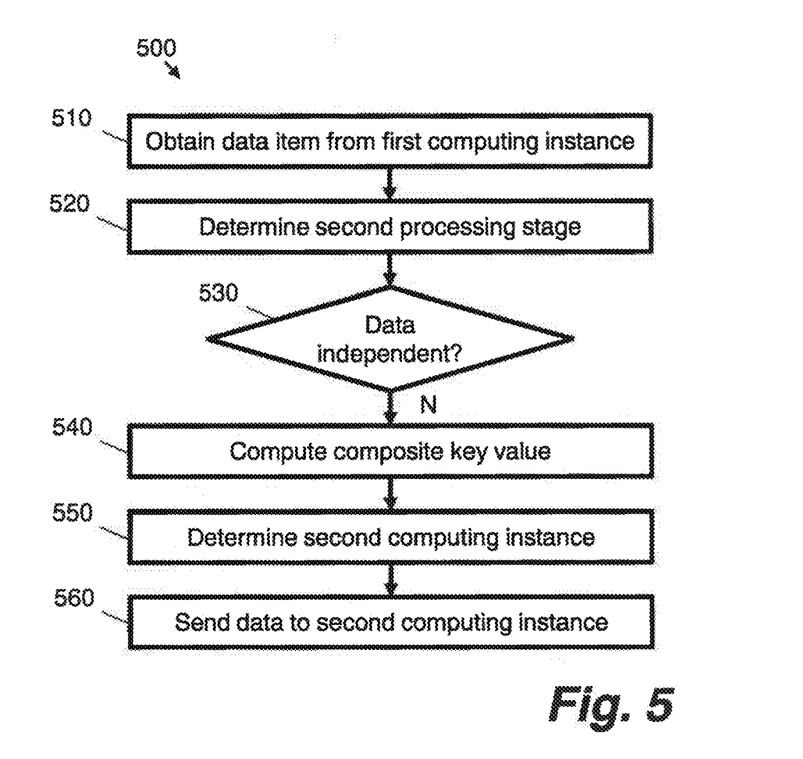
FIG. 5 is a flow diagram showing a distributed data processing method according to an example.

Turning to the method 500 of FIG. 5, at block 510 a data item output by a first computing instance is obtained. This data item may comprise a processed data record, i.e. may be associated with an event occurring in time (e.g. having a timestamp). In this case, the first computing instance forms part of a plurality of computing instances configured to implement, in parallel, a first processing stage in a plurality of interconnected processing stages. For example, the first computing instance could comprise one of instances 345 in FIGS. 3A and 3B or an instance implementing one of processing stages 430, 440 or 460 in FIG. 4.

The computing instances may comprise machine readable instructions that are stored in memory of a server computing device and that are executed by at least one processor of the server computing device. In one case, the computing instances may be implemented as processes operating on virtualized server computing devices. The computing instances may be implemented as operating system services that are arranged to operate continuously in memory, e.g. to listen for particular messages or data entries on a particular port or message queue. The computing instances may be implemented on common or different virtual/physical server computing devices. The computing instances are communicatively coupled, e.g. they are configured to exchange processed data records as shown by arrow 160 in FIG. 1.

At block 520 in FIG. 5, a determination is made, from data defining the plurality of interconnected processing stages, as to a second processing stage in the plurality of interconnected processing stages that is configured to receive data from the first processing stage. This may be performed based on the loaded configuration data 130, 230. For example, the interconnections between processing stages may dictate a next processing stage, e.g. in FIG. 4 the fifth processing stage 470 follows (and receives data items from) the fourth processing stage 460. At block 530, a check is made to determine whether the second processing stage is configured to process each data item independently of other data items, e.g. is a stateless or stateful processing stage. If the response of the check is negative ("N" in FIG. 5) then, responsive to a determination that the second processing stage is not configured to process each data item independently of other data items, e.g. is stateful, then blocks 540, 550 and 560 are performed.

At block 540, a composite key value is computed from fields associated with the obtained data item. The fields taken in account, and in certain cases an ordering of the fields, depends on the (stateful) second processing stage. For example, for an aggregation operation, a key may be computed from the grouping: {group by subscriber and device}. For a correlation, a key may be computed from a matching condition used to correlate events, e.g. where an "eventOne" subscriber identifier matches an "eventTwo" user identifier and where an "eventOne" session identifier matches an "eventTwo" session identifier; in this latter example the routing key for "eventTwo" may be {user, sessionId}. As such, the configuration of each routing is computed from the event processing graph taking in account the next processing stages. This may be performed as described above. At block 550, a second computing instance corresponding to the computed composite key value is determined, i.e. selected, from a plurality of computing instances implementing, in parallel, the second processing stage. At block 560, the data item output by the first computing instance is then sent to the determined second computing instance. As described above, following a first assignment of a particular key value to a particular computing instance, further occurrences of that key value are also routed to that particular computing instance. This was described above in relation to processing stages 360, 450 and 470.

In one case, at block 530, if the response of the check is in the affirmative ("Y") then, responsive that determination, a second computing instance is determined, i.e. selected, from a plurality of computing instances implementing, in parallel, the second processing stage according to a load balancing function. For example, this data distribution is implemented for processing stages 340, 430, 440 and 460 in the examples described above. In this case the response of the check indicates that the second processing stage is configured to process each data item independently of other data items.

In one case, the method 500 comprises, following block 560, receiving, by the second computing instance, the data item and aggregating or correlating, by the second computing instance, fields associated with the data item. For example, these are operations performed by processing stage 450 and 470 in FIG. 4. In this case, the composite key value is calculated as a function of a respective one of the aggregated or correlated fields.

In one case, prior to block 510, the method 500 comprises obtaining input data items from at least one real-time event stream, e.g. as described with relation to streams 140, 310, 410 and 420. In this case, the method 500 then comprises passing said data items to the plurality of computing instances configured to implement in the first processing stage, e.g. this may be performed using the same method 500. Distribution of the data items may be performed in a stateful or stateless manner depending on the nature of the data processing operation that is performed at the first processing stage. In any case, the method 500 then comprises, prior to block 510 outputting processed data items from plurality of computing instances implementing the first processing stage. In one case, processing may be performed asynchronously per data item, e.g. as soon as a data item is output it is passed to a subsequent computing instance. In certain cases, there may be queue and/or buffer stages between processing stages, e.g. to regulate flow or to collect records over a defined time period.

In one case, the determination of the second processing stage at block 520 is performed based on a defined interconnection between the stages. For example, the method 500 may comprise, prior to the shown blocks, defining at least the first and second processing stages, and at least one interconnection between said stages, using a graphical user interface. Following this there may be the further block of storing data defining the processing stages and the at least one interconnection, e.g. for use to implement block 520.

Figure 6:
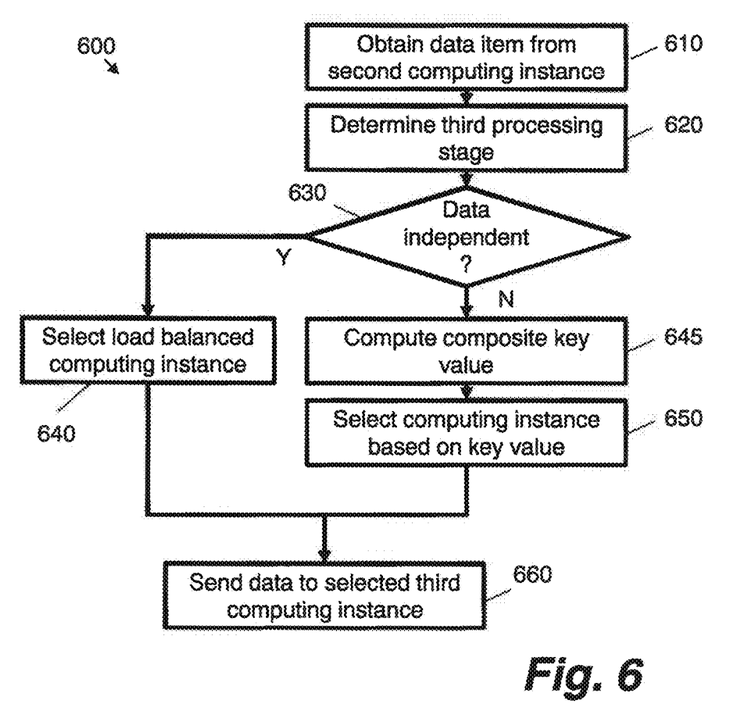
FIG. 6 is a flow diagram showing additional operations in a distributed data processing method according to an example.

FIG. 6 shows a method 600 that may follow method 500 in certain cases. At block 610 a data item output by the second computing instance is obtained. At block 620, a determination is made, from data defining the plurality of interconnected processing stages, as to a third processing stage in the plurality of interconnected processing stages that is configured to receive data from the second processing stage. For example, this may be performed using the configuration data as defined above. At block 630, a check is made to determine whether the third processing stage is configured to process each data item independently of other data items. Responsive to a determination that the third processing stage is configured to process each data item independently of other data items ("Y"), a third computing instance is determined at block 640. At block 640 the third computing instance is determined from a plurality of computing instances that implement, in parallel, the third processing stage. At block 640, the third computing instance is determined according to a load balancing function. Alternatively, responsive to a determination that the third processing stage is not configured to process each data item independently of other data items ("N"), a composite key value is computed at block 645. The composite key value in this case is computed from fields associated with the data item output by the second computing instance. At block 650, a third computing instance is determined corresponding to the computed composite key value. The third computing instance is selected from the plurality of computing instances implementing the third processing stage. In both cases at block 660, the data item output by the second computing instance is sent to the determined third computing instance, e.g. as selected at one of blocks 640 or 650.

The example methods 500 and/or 600 may be used to provide real-time data analytics for computing and/or telecommunications systems to enable those systems to be managed and in certain cases optimized. The example methods, as with the aforementioned example systems, may address a challenge of how to process massive volumes of real-time events while minimizing the time taken to process the events and to generate actionable data outputs. This challenge is addressed, in certain cases, by performing an intelligent real-time distribution of computing instances across multiple servers within a cluster. A routing or data distribution function is applied at each stage of a processing flow, which enables scalability with a minimal synchronization overhead. This maximizes a performance of the cluster in terms of a processing rate, reduces a data processing latency and enables actions to be taken in real-time or near real-time (e.g. a data processing time for a complete pipeline being of the order of seconds). This then enables rapid control, such as to provide responsive control to user equipment actions, e.g. geo-localized actions, fraud detection and/or personalized network configurations based on current usage patterns.

Figure 7:
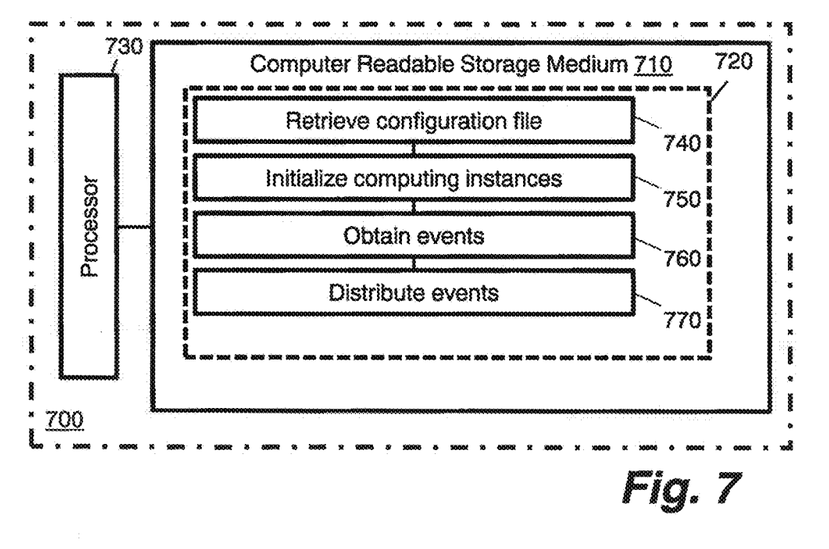
FIG. 7 is a schematic diagram showing a computer readable storage medium according to an example.

FIG. 7 shows a computer device 700 comprising a non-transitory computer-readable storage medium 710 storing instructions 720 configured to implement a complex event processing engine, e.g. the engine 110 or 210 in FIG. 1 or 2. The computer-readable storage medium 710 may be connected to a processor 730. The computer-readable storage medium 710 may comprise any machine-readable storage media, e.g. such as a memory and/or a storage device. Machine-readable storage media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In one case, the processor 730 may be arranged to store instructions 720 in memory such as RAM to implement the complex event processing engine.

The instructions 720 are configured to cause the processor to first, via instruction 740, retrieve a configuration file defining an event processing pipeline. The event processing pipeline comprises a plurality of event processing operations and a plurality of connections coupling said operations indicating a logical sequence for the event processing pipeline. Via instruction 750, the processor is caused to initialize a plurality of computing instances for each event processing operation across a cluster of server computing devices. The plurality of computing instances are configured to perform the event processing operation in parallel. Instruction 760 is configured to then cause the processor to obtain events from at least one real-time event stream. In this case, each event comprises at least one data field. Lastly via instruction 770, the processor is instructed to distribute the obtained events between the plurality of computing instances.

In the example of FIG. 7, each computing instance is configured to receive input data associated with an event and to output data following performance of the event processing operation. In a case where an event processing operation is based on a relationship between events, the instruction 770 causes the processor to route events from computing instances of a previous event processing operation to computing instances of a subsequent event processing operation based on a compound index based on the subsequent event processing operation. By doing this events with the same compound index are sent to the same computing instance. As such the instructions implement an example similar to the examples described above.

The preceding description has been presented to illustrate and describe examples of the principles described. This description is not intended to be exhaustive or to limit these principles to any precise form disclosed. For example, even though examples with two or three processing stages have been described, real-world implementations may have different numbers of processing stages and different processing pipeline configurations. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A data processing system comprising:
a complex event processing engine to distribute real-time data processing operations between server computing devices, the complex-event processing engine being configured to:
load configuration data defining processing stages in a processing pipeline, the processing pipeline being configured to process at least one data record stream;
instruct a distributed assignment of computing instances across the server computing devices, each server computing device loading a computing instance into memory for execution by at least one processor, the computing instances implementing each processing stage in parallel; and
instruct data distribution between the computing instances implementing each processing stage,
wherein, for a stateful processing stage, data distribution is performed based on a composite key computed according to a data processing operation performed by the stateful processing stage such that input data records from a previous processing stage having a common composite key value are sent to a common computing instance for the stateful processing stage.

2. The data processing system of claim 1, comprising:
a graphical user interface (220) to receive commands from a client device relating to an ordering of the processing stages In the processing pipeline and to store the configuration data relating to the processing pipeline following the ordering.

3. The data processing system of claim 1, wherein each processing stage comprises one of:
a data loader to read data from at least one file or stream;
an event processor to perform a defined data processing operation; and
a data writer to save data to at least one file or stream.

4. The data processing system of claim 1, wherein the complex event processing engine and the server computing devices are implemented as virtualized network functions.

5. The data processing system of claim 1, wherein the complex event processing engine comprises:
a routing component to route a data record from a computing instance of a first processing stage to a computing instance of a second processing stage,
wherein, responsive to the second processing stage being stateless, the routing component is configured to select the computing instance of the second processing stage based on a load balancing function, and
wherein, responsive to the second processing stage being stateful, the routing component is configured to:
compute a value for the composite key based on a data processing operation performed by the second processing stage;
identify a computing instance of the second processing stage that is configured to process data records having the computed value for the composite key; and
route the data record to the identified computing instance.

6. The data processing system of claim 1, wherein at least one processing stage comprises one of the following data processing operations:
   an aggregation operation;
   a correlation operation;
   a geolocation tracking operation; and
   a pattern detection operation,
   wherein for the aggregation operation the composite key comprises a hash of a set of aggregated data field values,
   wherein for the correlation operation the composite key comprises a hash of a set of correlated data field values,
   wherein for the geolocation tracking operation the composite key comprises a hash of a set of data field values associated with a moving entity, and
   wherein for the pattern detection operation the composite key comprises a hash of a set of data field values in which a pattern is to be detected.

7. The data processing system of claim 1, comprising:
   a cluster of server computing devices, each server computing device comprising memory and at least one processor, the cluster of server computing devices being communicatively coupled to the complex event processing engine and configured to continuously implement a plurality of computing instances in said memory.

8. A distributed data processing method comprising:
   obtaining a data item output by a first computing instance, the first computing instance forming part of a plurality of computing instances configured to implement in parallel a first processing stage in a plurality of interconnected processing stages, the data item being associated with an event occurring at a given time;
   determining, from data defining the plurality of interconnected processing stages, a second processing stage in the plurality of interconnected processing stages configured to receive data from the first processing stage;
   determining whether the second processing stage is configured to process each data item independently of other data items; and
   responsive to a determination that the second processing stage is not configured to process each data item independently of other data items:
      computing a composite key value from fields associated with the obtained data item;
      determining a second computing instance corresponding to the computed composite key value from a plurality of computing instances implementing the second processing stage in parallel; and
      sending the data item output by the first computing instance to the determined second computing instance.

9. The method of claim 8, comprising:
   responsive to a determination that the second processing stage is configured to process each data item independently of other data items, determining a second computing instance from a plurality of computing instances implementing the second processing stage in parallel according to a load balancing function.

10. The method of claim 8, comprising:
    obtaining a data item output by the second computing instance;
    determining, from data defining the plurality of interconnected processing stages, a third processing stage in the plurality of interconnected processing stages configured to receive data from the second processing stage;
    determining whether the third processing stage is configured to process each data item independently of other data items; and
    responsive to a determination that the third processing stage is configured to process each data item independently of other data items:
       determining a third computing instance from a plurality of computing instances implementing, in parallel, the third processing stage according to a load balancing function, or
    responsive to a determination that the third processing stage is not configured to process each data item independently of other data items:
       computing a composite key value from fields associated with the data item output by the second computing instance;
       determining a third computing instance corresponding to the computed composite key value from the plurality of computing instances implementing the third processing stage; and
       sending the data item output by the second computing instance to the determined third computing instance.

11. The method of claim 8, wherein:
    the first computing instance comprises machine readable instructions that are stored in memory of a first server computing device and that are executed by at least one processor of the first server computing device;
    the second computing instance comprises machine readable instructions that are stored in memory of a second server computing device and that are executed by at least one processor of the second server computing device, and
    the first and second server computing devices are communicatively coupled.

12. The method of claim 8, comprising:
    receiving, by the second computing instance, the data item; and
    aggregating or correlating, by the second computing instance, fields associated with the data item,
    wherein the composite key value is calculated as a function of a respective one of the aggregated or correlated fields.

13. The method of claim 8, comprising, prior to obtaining the data item output by the first computing instance:
    obtaining input data items from at least one real-time event stream and passing said data items to the plurality of computing instances configured to implement in the first processing stage; and
    outputting processed data items from the plurality of computing instances implementing the first processing stage.

14. The method of claim 8, comprising:
    defining at least the first and second processing stages, and at least one interconnection between said stages, using a graphical user interface; and
    storing data defining the first and second processing stages and the at least one interconnection.

15. A non-transitory machine readable medium comprising instructions which, when loaded into memory and executed by at least one processor of a complex event processing engine, cause the at least one processor to:
    retrieve a configuration file defining an event processing pipeline, the event processing pipeline comprising a plurality of event processing operations and a plurality of connections coupling said operations indicating a logical sequence for the event processing pipeline;

initialize a plurality of computing instances for each event processing operation across a cluster of server computing devices, the plurality of computing instances being configured to perform the event processing operation in parallel;

obtain events from at least one real-time event stream, each event comprising at least one data field; and distribute the obtained events between the plurality of computing instances, wherein each computing instance is configured to receive input data associated with an event and to output data following performance of the event processing operation, and wherein, for an event processing operation based on a relationship between events the instructions cause the at least one processor to:

route events from computing instances of a previous event processing operation to computing instances of a subsequent event processing operation based on a compound index defined based on the subsequent event processing operation, such that events with the same compound index are sent to the same computing instance.

* * * * *